United States Patent [19]

Scholz

[11] Patent Number: 4,699,167
[45] Date of Patent: * Oct. 13, 1987

[54] ELECTRIC VALVE

[76] Inventor: Joachim Scholz, An der Ziegelei 14, 7551 Bischweier, Fed. Rep. of Germany

[*] Notice: The portion of the term of this patent subsequent to Dec. 2, 2003 has been disclaimed.

[21] Appl. No.: 860,509

[22] Filed: May 7, 1986

[30] Foreign Application Priority Data

May 8, 1985 [EP] European Pat. Off. ........ 85105643.2

[51] Int. Cl.⁴ ............................................. G05D 16/06
[52] U.S. Cl. ................................. 137/116.5; 137/627.5
[58] Field of Search ........................... 137/116.5, 627.5

[56] References Cited

U.S. PATENT DOCUMENTS

| | | | |
|---|---|---|---|
| 3,578,024 | 5/1971 | Hill | 137/627.5 |
| 4,452,269 | 6/1984 | Ott | 137/116.5 |
| 4,499,921 | 2/1985 | Stoll | 137/627.5 |

Primary Examiner—Robert G. Nilson
Attorney, Agent, or Firm—Larson and Taylor

[57] ABSTRACT

An electric valve is provided for control of a fluid between a fluid source 9, a user 10 and a fluid removal. A valve member 2 configured as hollow cylinder is axially adjustable in an input opening 8 connected continuously with a pressure medium and blocked against a pressure medium outlet opening 18 housing. Its one edge surrounds an opening connected with the outlet opening 18. Its second edge 31 works with a valve seat arranged axially parallel to an air removal opening 30 and surrounds a second valve seat in a flow passage 34. A setting member 3 cooperates with this valve seat which counters a return force. A central body 40a of valve member 2 is arranged in the flow passage 34 of valve member 2, which surrounds a central opening 100, of which the transverse section together with the transverse section of the flow passage 34 between the central body 40a and second edge 31 of the valve member 2 corresponds approximately to the transverse section of the flow passage 101 between setting member 3 and the outside wall of the flow passage.

6 Claims, 1 Drawing Figure

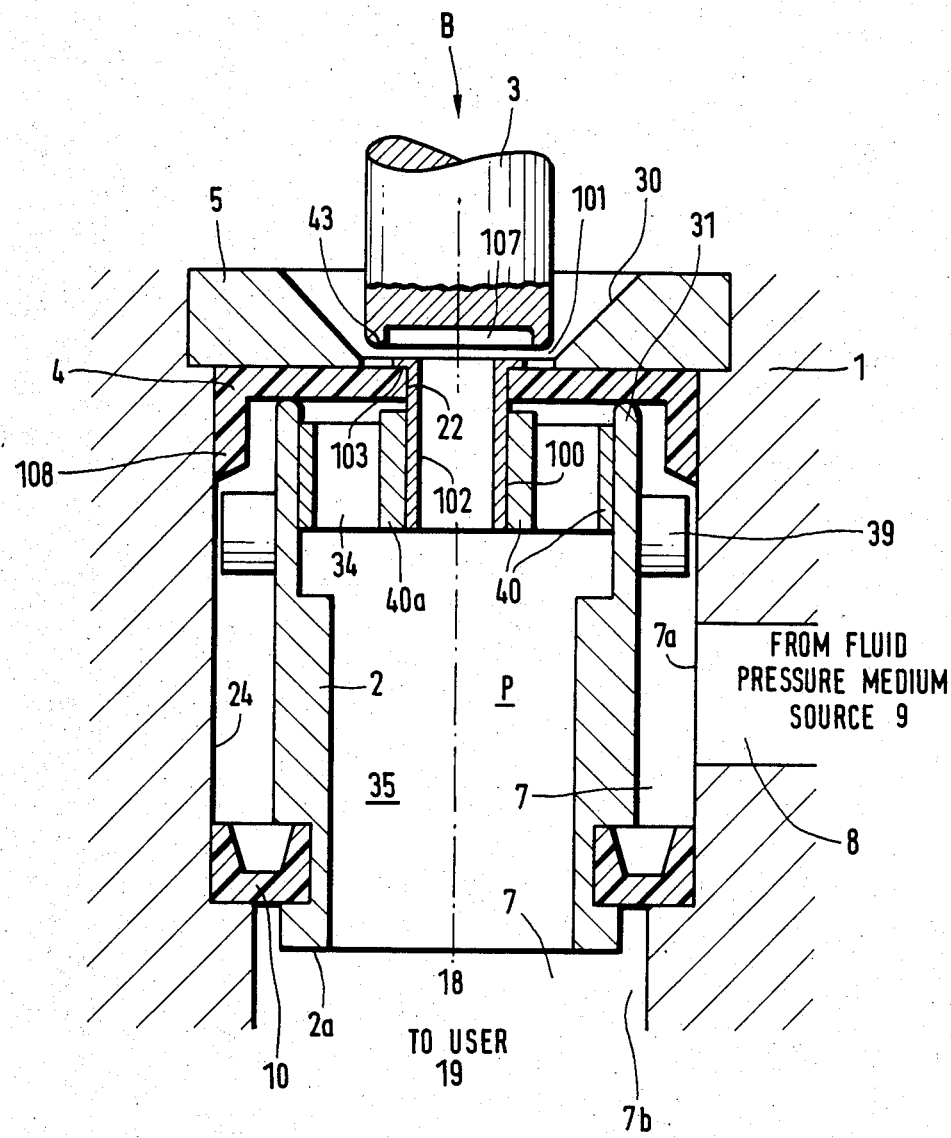

ELECTRIC VALVE

DESCRIPTION

The invention relates to a power-controlled pressure regulation valve or electrically controllable valve.

The object of the not yet published German Patent Application P 33 40 525.5 is an electric valve for control especially of a gaseous fluid between a fluid source with adequate, relatively high pressure, a user and a fluid removal with adequate, relatively low pressure. The most important components parts of this valve are a valve housing with connections for the fluid source, the user and the fluid removal, a valve member adjustable in the housing for control of the connections and a control piston acting on the valve member through a diaphragm in a special manner, and an external force is exerted on the piston, of which the magnitude determines the pressure prevailing in the user. Because of its configuration therefore the valve serves not only as digital on-off control, in order to allow the user to remove air (connection to the fluid removal) or to allow a pressure to prevail in it corresponding to the pressure in the fluid source (connection to the fluid source), but in analogous work steps the valve allows the setting of any desired pressure in the user up to the pressure in the fluid source as maximum pressure solely by portioning of the external force acting on the control piston. The drawing relates to the features of the aforementioned valve in detail in combination with the later description of individual parts of the invention.

The invention is described within the scope of the following general discussion.

The pressure determined by the external force applied to the control piston causes a state of equilibrium to be set between air removal and ventilation state, and the pressure in the inside chamber of the valve member corresponds to and counters the external force. This is to be attained with the suggested valve in that a crown of openings is provided in the cover of the valve member, through which the connection between fluid course and user is produced during ventilation of the user, and with removal of air from the user the connection between user and air removal, and in equilibrium state of the fluid in the inside chamber of the valve member, it is possible to bring the counterpressure to the external force into effect. This solution provides a remarkably precise adjustment of the spacing between the cover of the valve member and the bottom of the diaphragm, which can be undesirable for various reasons. The object of the invention is to further configure the aforementioned solution so that the fluid pressure in the inside chamber of the valve member in state of equilibrium can with simple and reliable means be brought into effect against the external force working on the control piston. With the object of the invention a central opening is to be used in the cover of the valve member within the aforementioned crown of openings which is located there, which is already provided in prior solutions, without however its having a certain function recognized as associated with it. As a result of this arrangement, with the present invention it is suggested that a central opening surrounded by the support is of such dimensions that its diameter together with the transverse section of the flow passage between support and the second edge of the valve member corresponds approximately to the section of the flow passage between control piston and outside wall of the flow passage.

Although the prior valve construction requires that in a state of equilibrium there not be too great a constriction between the fluid venting flow passages on opposite sides of the elastic diaphragm, this problem does not arise with the dimensioning of the central opening provided in according to the invention. On the other hand, the central opening provided ensures sufficient constriction is always available, so that the desired state of equilibrium can be maintained without special provisions. Accordingly, the invention provides the advantage of allowing extremely rapid air removal from the user. Preferably the transverse section of the opening surrounded by the support is to correspond at least approximately to the transverse section of the flow passage between control platon and outside wall of the flow passage.

The invention allows for another advantageous configuration of the invention so that a stop for the springing back of the diaghragm can be arranged extremely advantageously in the manner still to be described. When the cover of the valve is arranged as a stop by deformation of the diaphragm in one direction on one side of the diaphragm, that stop is to be arranged on the other side of the diaphragm, but is to be held on the cover. This occurs in an especially simple manner, in that the stop is a radial flange at one end of a sheathing, which is held in the central opening configured according to the invention. Thus a connection between the inside chamber of the valve member and removal area over the crown of openings is still difficult to accomplish while in the invention no problem is to be expected, when only the central bore or the sheathing are dimensioned accordingly.

Hereinafter the invention is to be explained in more detail relative to the drawing. A valve according to the invention is shown in the drawing in midline lengthwise section.

The power-controlled pressure regulation valve according to the invention is located between a pressure medium source 9 for any desired fluid, but particularly for a pneumatic fluid, for example, a compressed air tank and a utilization device or user 19, for example the operating cylinder of the compressed air brake of a vehicle. The valve housing 1 of the pressure regulation valve has a pressure medium inlet 8, a first pressure medium outlet 18 to the user 19 and a second pressure medium outlet into the environment, for example, into the surrounding air. The second pressure medium outlet consists essentially of the radial space between a countersunk bore 30 and a control piston 3.

When the valve is in an operation setting which is referred to as the ventilation or filling setting, pressure medium source 9 is connected through the valve to user 19, in order to fill this device with pressure fluid, i.e., for example compressed air, from pressure medium source 9. In another operation setting, referred to as the air removal setting of the valve, user 19 is connected to the surrounding medium, in order to be vented. Thus the valve closes off pressure medium source 9, in order to prevent its emptying.

The pressure, which can be produced at a maximum in user 19 by feeding of pressure medium from pressure medium source 9, is in fact, the prevailing pressure of pressure medium source 9. This pressure is set in user 19 as a part of the pressure prevailing in pressure medium source 9, which is dependent upon a force B, which is brought into effect, in response to a control signal, directly on control piston 3 in the direction of the lengthwise axis of the same, for example by means of an electromagnet.

The lengthwise axes of pressure medium input 8 and pressure medium outlet 18 intersect at an angle of 90°. Pressure medium input 8 and pressure medium outlet 18 open into a supply chamber 7, which is arranged axially parallel to pressure medium outlet 18 in housing 12, and which is closed or formed by a wall 24 of housing 1. A portion of chamber 7 is formed as a bore, which passes through housing 1 from one to the other end, and which is stepped from boh sides inward. Supply chamber 7 is closed on the end opposite pressure medium outlet 18 by a control diaphragm 4 formed of an elastomer, which engages, with the greater part of its outside periphery, the cover 5 of housing 1. Cover 5 is held tight on housing 1 by means of screws (not shown). In cover 5 is located the countersunk bore 30 axially parallel to supply chamber 7, and in control diaphragm 4, axially parallel to supply chamber 7, is located a bore 22. A chamber is connected to bore 30 which is considerably larger than the transverse section of cylindrical supply chamber 7, and the transverse section of bore 22 of control diaphragm 4 is considerably smaller than the transverse section of supply chamber 7. The smaller section of bore 30 faces toward bore 22 and is larger than the section of bore 22; the larger section of bore 30 is faces toward the larger chamber (surrounding the valve) connected to the bore.

Valve member 2, which is essentially a cylindrical sheath or sheathing, is arranged in supply chamber 7, and is closed at the top with a cover 40 and is provided with uniform "noses" or projections 39 distributed around the outside periphery, with which valve member 2 is guided radially without play but is axially adjustable in cylindrical supply chamber 7. Near the outside edge of cover 40 are distributed uniformly on the periphery a number of axial bores 34 as well as another axial bore 100 in the center. On its bottom, end valve member 2 has an annular clearance, into which is inserted a U-shaped ring 10, which is formed of elastically flexible material and by which valve member 2 is supported on a stop of wall 24.

In the operation setting of the valve according to the invention which is illustrated in the drawings, the valve member 2 is disposed with the top rounded edge 31 thereof forming a sealing surface against the bottom of control diaphragm 4. Pressure medium input 8 is in communication with a part 7a of the supply chamber 7 above ring 10, but this part 7a is blocked or sealed off by ring 10 and the engagement of valve member 2 with its edge 31 on the bottom of control diaphragm of pressure medium outlet 18. On the other hand, pressure medium outlet 18 is in communication, through a part 7b of supply chamber 7 which lies under or below ring 10, with the inside chamber 35 of valve member 2, which is in communication through axial bores 34, central bore 100, bore 22 of control diaphragm 4 and annular clearance 101 between piston 3 and bore 30, with the area surrounding the valve.

The operation setting of the valve as shown in the drawings is the operation setting in which user 19 is to have air removed therefrom. Fluid which is enclosed in user 19 can escape from user 19 through the valve. Pressure medium source 9 is blocked or separated from user 19.

If user 19 is to be ventilated, i.e., filled, pressure medium source 9 is connected to user 19 instead of being blocked therefrom. In order to bring the valve into suitable operation setting, a control force is applied to the control piston 3, which is directed against the valve, the control force being of an amplitude which is selected to correspond to the desired pressure in user 19. This control force acts to set piston 3 in the valve, i.e., to move piston 3 axially, until the inside rounded edge 43 of piston 3 seals against the inside, free edge area of control diaphragm 4 upon first contact therewith, and thereafter deforms this area inwardly with further adjustment. With further adjustment of the control piston 3, the axial play present between diaphragm and inside collar of cover 40 is overcome and with still further adjustment of piston 3 valve member 2 is thrust inward so that it releases its edge 31 from control diaphragm 4. The impact or engagement of control piston 3 with control diaphragm 4 terminates the air removal mode or state, and the annular clearance 101 between piston 3 and the edge of bore 30 is blocked off. If valve member 2 is lifted from control diaphragm 4, an annular clearance is freed or opened up which connects the part 7a of supply chamber 7 over ring 10 and therewith the fluid inlet 8 through bore 34 with inside chamber 35 of valve member 2 and therewith to pressure medium outlet 18. This operation setting of the valve according to the invention is the ventilation or filling setting for user 19.

A pressure is reached in inside chamber 35 of valve 2 which corresponds to the control force applied to control piston 3, and, if still more pressure fluid is added, then a state is reached in which valve chamber 35 of supply chamber 7 or its part 7a is separated, a state of equilibrium prevails, the user is blocked off both from the outlet between piston 3 and the wall forming bore 30 and also from feed or inlet 8.

For air removal from user 19 the control force is decreased on control piston 3, and piston 3 is moved outwardly under the pressure in the valve inside chamber 35, the inside wall of the control diaphragm follows and returns to the contour which is shown and, if the control piston is moved further outward, lifts this from the control diaphragm and pressure fluid escapes until equilibrium is reached again.

The bore 100 which is disclosed and described relative to its dimensions and purpose in the earlier patent application Ser. No. 732,785, filed May 9, 1985, now U.S. Pat. No. 4,625,750, is not described herein in more detail, where it now has the purpose of also guaranteeing air removal from user 19 even if this is impossible through axial bores 34 or is only inadequately possible. That is why in the first approximation the total of the transverse sections of axial bores 34 and of the transverse section of bore 100 is so determined that this total corresponds at least to the transverse section of annular clearance 101, so that user 19 can be ventilated to the extent that fluid flowing through annular clearance 101 can escape from it without a constriction being found before annular clearance 101. Preferably the transverse section of bore 100 corresponds at least approximately to the transverse section of annular clearance 101, so that through bore 100 alone, a constriction-free flow of fluid from the user 19 is possible.

This solution is especially provided for the case wherein a sheath or sheathing 102 is inserted in axial bore 100 of the central body of cover 40, which surrounds bore 100 and of which the top according to the invention, lies beneath top edge 31, the top end of the sheathing being configured as radial flange 103 for providing a limitation on the springing back or resilient return of diaphragm 4 when control piston 3 is raised. Thus the free transverse section of sheathing 102 is dimensioned so that this section corresponds at least approximately to the transverse section of annular clearance 101, and bore 100 therefore must be correspondingly larger. Sheathing 102 is guided through bore 22 of diaphragm 4 and the radial flange 103 lies over diaphragm 4. If control piston 3 is moved downward in the described manner, then diaphragm 4 is removed from the bottom of radial flange 103 downward, until it comes into contact on the top of the central body of cover 40 and moves valve member 2 inwardly (relative to the valve) or downwardly (relative to the plane of the drawing), to provide lifting of edge 31 from diaphragm 4 of control piston 3 over the inside edge of the diaphragm and the central body of cover 40. Now if the pressure in inside chamber 35 of valve 2 exceeds force B, so that control piston 3 is moved upwardly, then relaxing diaphragm 4 can follow sufficiently far in the area of inside edge to control piston 3, that diaphragm 4 comes into contact on radial flange 103. If radial flange 103 is not provided as effective stop, then only by careful selection of the material of diaphragm 4 can this member be prevented from following control piston 3 over the represented air removal setting outwardly and in turn closing or restricting annular clearance 101. With use of radial flange 103 as diaphragm stop according to the invention, the material of the diaphragm can be selected without any attention to this problem. On the other hand, it can be shown that the dimensioning of bore 100 according to the invention without the insert 102 is advantageous, but with use of the insert it is especially advantageous, in order to allow the air removal. Without the central body of cover 40 and bottom of diaphragm 4, a connection must be provided between axial bores 34 and annular clearance 101.

I claim:

1. An electric valve for control of fluid flow between a relatively high fluid pressure source, a utilization device and a fluid venting port connected to a relatively low pressure, said apparatus comprising a supply chamber permanently connected the fluid source, a longitudinally movable valve member disposed in the supply chamber so as to define an outer annular portion of the supply chamber, a first edge of the valve member defining a connection between an inside chamber formed in the valve member and the utilization device, an opposite, second edge of the valve member which cooperates with an elastic diaphragm disposed in the supply chamber such that when the second edge of the valve member is spaced from the elastic diaphragm a connection is provided between the inside chamber of the valve and the outer annular and when the second edge is engagement with the diaphragm, said connection is broken, said second edge defining an area in which a flow passage is defined, a central body portion of the valve member being arranged as a support for an edge of the diaphragm surrounding a central opening in the diaphragm, said diaphragm being in engagement with a surface of a cover supported on a surface of the valve housing and an unsupported portion of the diaphragm being deflectable away from said surface of the cover by means of a control piston one edge of which controls an annular flow passage formed in the cover, the outside diameter of the annular flow passage being greater than the diameter of the central opening of the diaphragm and the inside diameter of the annular flow passage being determined by the outside diameter of the control piston, the control piston being movable in responsive to an external force along a path in the direction of engagement with the diaphragm such that at the end of said path the diaphragm in the area of the edge surrounding the central diaphragm opening is deflected away from the surface of the cover and is brought into engagement with the central body portion of the valve member, and the diaphragm returning to the original state in response to internal pressure within the valve member when this pressure exceeds the external force on the control piston by a predetermined amount, wherein the improvement comprises the provision of a central opening defined by the central body portion of the valve member which is dimensions such that the transverse cross section thereof together with the transverse cross section of said flow passage defined between the central body portion and the second edge of the valve member corresponds approximately to the transverse cross section of the annular flow passage between the outer surface of the control piston and the outside wall of the flow passage.

2. Valve as in claim 1, characterized in that the transverse section of the central opening surrounded by the central body portion of the valve member corresponds at least approxiamtely to the transverse section of the annular flow passage between the control piston and the outside wall of the annular flow passage.

3. Valve as in claim 2, further comprising a stop in the area of the central opening in the diaphragm which limits a resilient return of the diaphragm in the area surrounding said central opening therein, when the control piston returns to the original position thereof responsive to the internal pressure in the inside chamber of the valve member.

4. Valve as in claim 3, wherein said stop comprises an end flange of a sleeve inserted in the central opening in the central body portion of the valve member the inside transverse cross section of said sleeve corresponding approximately to the transverse cross section of the annular flow passage (101) between control piston and the outside wall of the annular flow passage.

5. Valve as in claim 4, wherein the outside diameter of the end flange is smaller than the diameter of a recess defined by the said one edge of the control piston.

6. Valve as in any one of the claims 1 to 4, wherein the diaphragm includes a cylindrical axial flange which engages the outer wall of the outer annular portion of the supply chamber, and wherein the valve housing and valve cover are rigidly connected with each other.

* * * * *